(12) United States Patent
Vacca et al.

(10) Patent No.: US 11,285,800 B2
(45) Date of Patent: Mar. 29, 2022

(54) DEVICE FOR REGULATING AN AIR FLOW FOR A MOTOR VEHICLE FRONT END MODULE

(71) Applicant: Valeo Systemes Thermiques, Le Mesnil Saint Denis (FR)

(72) Inventors: Frédéric Vacca, Le Mesnil Saint Denis (FR); Simon Tierce, Le Mesnil Saint Denis (FR); Karim Arab, Le Mesnil Saint Denis (FR); Sophie Bede, Le Mesnil Saint Denis (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 17 days.

(21) Appl. No.: 16/651,656

(22) PCT Filed: Sep. 18, 2018

(86) PCT No.: PCT/FR2018/052279
§ 371 (c)(1),
(2) Date: Mar. 27, 2020

(87) PCT Pub. No.: WO2019/063910
PCT Pub. Date: Apr. 4, 2019

(65) Prior Publication Data
US 2020/0307371 A1    Oct. 1, 2020

(30) Foreign Application Priority Data
Sep. 27, 2017  (FR) ..................................... 1758933

(51) Int. Cl.
*B60K 11/00*  (2006.01)
*B60K 11/08*  (2006.01)

(52) U.S. Cl.
CPC .................................. *B60K 11/085* (2013.01)

(58) Field of Classification Search
CPC .............................. B60K 11/085; B60K 11/04
(Continued)

(56) References Cited

U.S. PATENT DOCUMENTS 5,732,507 A * 3/1998 Edwards ................. E04B 7/163
49/74.1
9,233,605 B2 * 1/2016 Hijikata ............... B60K 11/085
(Continued)

FOREIGN PATENT DOCUMENTS

DE   102016009097 A1   2/2017
FR       2972392 A1   9/2012

OTHER PUBLICATIONS

International Search Report issued in corresponding International Patent Application No. PCT/FR2018/052279, dated Jan. 28, 2019 (7 pages).
(Continued)

*Primary Examiner* — Hau V Phan
(74) *Attorney, Agent, or Firm* — Osha Bergman Watanabe & Burton LLP

(57) ABSTRACT

An air flow regulation device for an air inlet of a front-end module for a motor vehicle includes a support frame with multiple blocking flaps mounted mobile on the support frame. At least one of the blocking flaps of the support frame includes a leading edge and a trailing edge, and one of the leading and trailing edges is arranged to come into abutment against the support frame. The support frame includes an obstacle configured to generate disturbances in the flow of the air between the support frame and the flap that comes into abutment against the frame.

11 Claims, 3 Drawing Sheets

(58) Field of Classification Search
USPC .......................................................... 180/68.1
See application file for complete search history.

(56) References Cited

U.S. PATENT DOCUMENTS

| | | | |
|---|---|---|---|
| 9,650,786 B2* | 5/2017 | Weaver | E04B 7/163 |
| 9,845,003 B2* | 12/2017 | Povinelli | B60R 19/52 |
| 2011/0005851 A1* | 1/2011 | Doroghazi | B60R 13/0838 |
| | | | 180/68.1 |
| 2012/0019025 A1 | 1/2012 | Evans et al. | |
| 2012/0118656 A1* | 5/2012 | Roddy | B60K 11/085 |
| | | | 180/68.1 |
| 2013/0025952 A1* | 1/2013 | Kitashiba | B60K 11/085 |
| | | | 180/68.1 |
| 2014/0335778 A1 | 11/2014 | Takanaga et al. | |
| 2016/0116184 A1* | 4/2016 | Chappell | F24F 13/1406 |
| | | | 454/335 |
| 2016/0236563 A1* | 8/2016 | Ruppert | B60R 19/52 |
| 2017/0129324 A1* | 5/2017 | Kaneko | B60K 11/04 |
| 2017/0248066 A1* | 8/2017 | Wolf | F01P 7/10 |
| 2017/0326971 A1* | 11/2017 | Cosmo | B60K 11/085 |

OTHER PUBLICATIONS

Written Opinion issued in corresponding International Patent Application No. PCT/FR2018/052279, dated Jan. 28, 2019 (12 pages).

\* cited by examiner

DEVICE FOR REGULATING AN AIR FLOW FOR A MOTOR VEHICLE FRONT END MODULE

BACKGROUND

The subject of the invention is a blocking flap for an air flow regulation device for a front-end module for a motor vehicle. The invention relates also to the air flow regulation device for an air inlet for a front-end module for a motor vehicle, also called active grille shutter, or even air inlet control device. Such a device is often designated by the acronym AGS, from the expression "Active Grille Shutter". The invention relates also to the front-end module for a motor vehicle comprising such an air flow regulation device.

The air flow behavior of a motor vehicle is an important feature because it influences in particular the fuel consumption (and therefore the pollution) as well as the performance levels of said vehicle. This is particularly important when the motor vehicle is running at high speed.

An air flow regulation device for a front-end module makes it possible to open or close the air access via a grille of the motor vehicle. In open position, the air can circulate through the grille and contribute to the cooling of the engine of the motor vehicle. In closed position, the air does not enter via the grille which reduces the drag and therefore makes it possible to reduce the fuel consumption and CO2 emission. The AGS therefore makes it possible to reduce the energy consumption and pollution when the engine does not need to be cooled by the outside air.

An air flow regulation device for a front-end module usually comprises flaps driven by a front-end actuator in order to reduce the drag coefficient and also enhance the cooling and air conditioning performance levels. These flaps are usually flat, and are generally oriented vertically in closed position and horizontally in open position. Moreover, the flaps have ends situated on either side of a plane passing through said axis of rotation so as to allow an overlapping of one of the ends of said flap by the otl1er end of a same flap disposed adjacently, in the closed position of the flaps. There is thus a good seal, notably through a plane-on-plane contact. However, such ends constitute another source of increase of the aeraulic signature of the flaps in the between-open position. Indeed, in the case where the blocking flaps are in a partially open position, the air flow circulates at high speed in a substantially laminar manner and moves through a restricted space formed between the different blocking flaps and the support frame of the blocking flaps. in some cases, notably when the flaps switch from an open position to the closed position, these high-speed laminar air flow rates generate undesirable noises such as whistling.

There is a need to overcome this drawback.

SUMMARY

The subject of the invention is thus an air flow regulation device for an air inlet for a front-end module for a motor vehicle, comprising:
  a support frame,
  a plurality of blocking flaps mounted mobile on the support frame, at least one of the flaps comprising a leading edge and a trailing edge, one of these edges being arranged to come into abutment against the support frame,
  the support frame comprising an obstacle configured to generate disturbances in the flow of the air between this support frame and the flap which is intended to come into abutment against the frame.

Thus the disturbances break the flow of the air flow thus reducing the laminar high speed of the air flow. For example, if the structure of the flow of the air flow corresponds to a flow vortex, this high-speed laminar flow can be reduced by breaking the vortex into several smaller swirls. Thus, the air pressure waves passing U1rougl1 the space defined by the blocking flaps are smaller and are no longer synchronized, thus neutralizing them against one another, thus reducing the whistling noise in the air flow regulation device. By providing one or more obstacles on the support frame, it is possible to further attenuate the noise which could be generated between the support frame and the flaps which are adjacent to the frame.

According to one aspect of the invention, the obstacle on the frame comprises a protuberance protruding notably substantially at right angles to the plane of the frame.

According to one aspect of the invention, the obstacle extends on a crossmember of the frame.

According to one aspect of the invention, the obstacle of the frame extends only a portion of the length of the crossmember.

According to one aspect of the invention, the support frame comprises a plurality of obstacles configured to generate disturbances in the flow of the air between this support frame and the flap which is intended to come into abutment against the frame.

According to one aspect of the invention, the obstacles are distributed, notably at regular intervals, over a crossmember of the support frame.

According to one aspect of the invention, the obstacle has the form of a notch.

As a variant, the obstacle has a pin form or any other suitable form.

According to one aspect of the invention, the obstacle of the frame has a substantially rectangular perimeter when it is observed from a direction at right angles to a crossmember of the support frame.

According to one aspect of the invention, each flap comprises a panel with the leading edge and the trailing edge relative to the flow of the air, and the trailing edge comprises at least one obstacle configured to generate disturbances of the flow of the air.

According to one aspect of the invention, the obstacle of the flap comprises at least one protuberance protruding from the plane of the trailing edge or, as a variant, from the leading edge of the flap.

According to one aspect of the invention, the obstacle of the flap is arranged to come into contact with the obstacle on the frame when the flap is in abutment against the support frame.

Other embodiments propose, for the obstacles on the flaps, that:
  the obstacle comprises at least one protuberance protruding from the plane of the trailing edge;
  the leading edge comprises at least one obstacle configured to generate disturbances of the flow of the air;
  said at least one obstacle arranged on the leading edge is positioned on a face of the blocking flap opposite the face where said at !east one obstacle arranged on the trailing edge is positioned;
  the trailing edge and/or the leading edge comprises a plurality of obstacles distributed uniformly on the trailing edge and/or the leading edge;
  the obstacles are distributed on tile trailing edge on the two opposing faces of the blocking flap;

the leading edge comprises obstacles arranged on two opposing faces of the blocking flap;

the panel comprises an internal cavity, or, in other words, the panel is hollow; the trailing edge comprises at least two ribs spaced apart and arranged so as to define a groove between the two ribs;

the trailing edge comprises obstacles arranged on two opposing faces of the blocking flap.

The invention relates also to an air flow regulation device for an air inlet for a front-end module for a motor vehicle, comprising a plurality of blocking flaps as described previously, a support frame on which the blocking flaps are arranged. According to the invention, the trailing edge of each blocking flap is arranged to come into abutment against the leading edge of another blocking flap or against the support frame.

According to the invention, each obstacle arranged on the leading edges is of a form complementing each obstacle arranged on the trailing edges so as to completely block the air inlet when the flaps are in a closed configuration in which the blocking flaps prevent the air from flowing.

The invention relates also to a blocking flap for an air flow regulation device for a front-end module for a motor vehicle, comprising a panel with a leading edge and a trailing edge relative to the flow of the air, characterized in that the trailing edge comprises at least one obstacle configured to generate disturbances of the flow of the air. The flap according to the invention obviously comprises the features itemized above.

BRIEF DESCRIPTION OF DRAWINGS

Other features and advantages of the invention will emerge on reading the following description. The latter is purely illustrative and should be read in light of the attached drawings in which:

FIGS. 6A and 68 each illustrate a blocking flap according to the invention according to a particular embodiment from a profile view.

DETAILED DESCRIPTION

Figure 1:
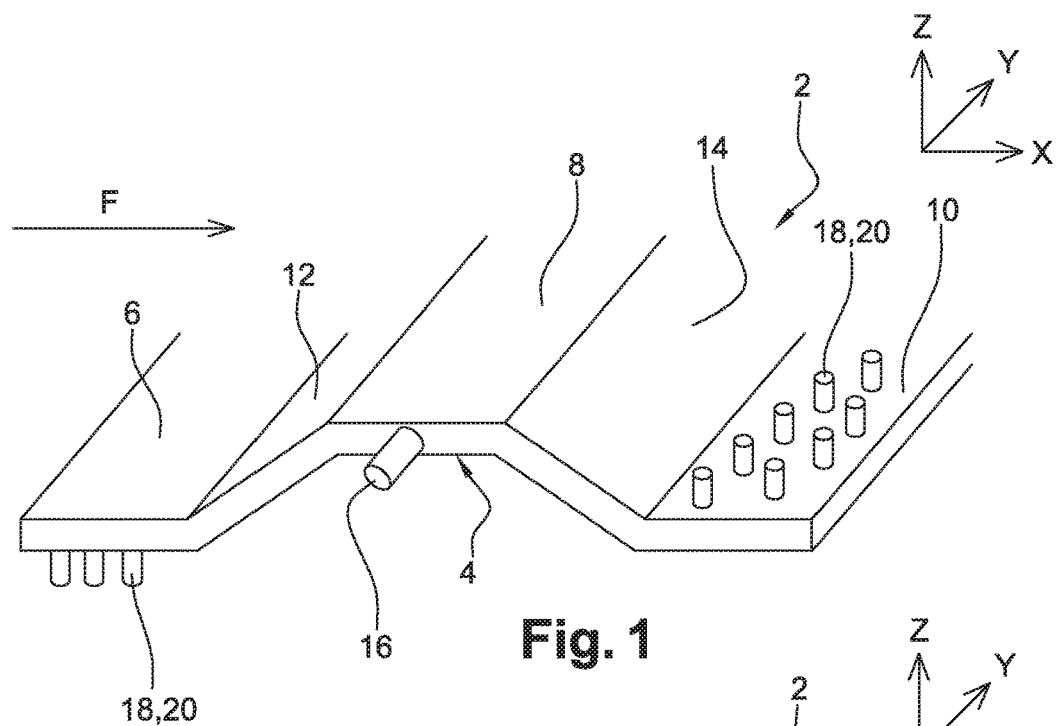
FIG. 1 illustrates a part of the blocking flap according to a first embodiment from a perspective view.

FIG. 1 schematically illustrates a blocking flap 2 according to an embodiment of the invention from a perspective view. The blocking flap 2 extends in a longitudinal (X), transverse (Y) and vertical (Z) direction, for example relative to the axes of the vehicle, as represented by the axes in FIG. 1.

The blocking flap 2 comprises a panel 4 which is composed of three flat parts 6, 8 and 10, a central flat part 8 situated between the other two end flat parts 6, 10 each being situated at a longitudinal end of the blocking flap 2. The central flat part 8 is linked to each end flat part 6, 10 by an inclined section 12,14, otherwise called ramp, so that the central flat part 8 is offset vertically (Z) relative to the two end flat parts 6,10. In other words, the blocking flap 2, and in particular the panel 4, have an omega profile section. In other words, the end flat parts 6,10 are arranged in one and the same plane whereas the central flat part 8 is arranged in a distinct plane parallel to the plane of the end flat parts 6,10. Obviously, the invention is not limited to the form of the blocking flat 2, and other forms of flap can be envisaged such as a rectangular panel inscribed in a single plane, etc.

Relative to the flow of the air flow F, which is illustrated here by the arrow F, the blocking flap 2 is configured in such a way that the first end flat part 6 is intended to be passed through by the air flow F. The first end flat part 6 corresponds to the leading edge 6 which is flat. The second and last end flat part 10 intended to be passed through by the air flow F corresponds to the trailing edge 10 which is flat. The inclined sections 12, 14 do not form part of the leading 6 and trailing 10 edges. The blocking flap 2 further comprises a rotation axis 16 arranged here at the central part 8 in order to allow the pivoting of the blocking flap 2 about this rotation axis 16.

In other words, each blocking flap 2 comprises a leading edge 6 and a trailing edge 10 relative to the flow of the air. The leading edge 6 of the flap is the front section of the aerodynamic profile that the blocking flap 2 constitutes. The leading edge 6 thus includes the stagnation point where the flow is divided into two sections (each passing on one side of the profile). The leading edge 6 faces the relative wind, it is the part of the blocking flap 2 that the relative wind reaches first when the device is installed in a motor vehicle in motion (going forward). The trailing edge 10 is the rear part of the profile of the flap.

The rotation axis 16 of each blocking flap 2 makes it possible, by rotation, to open and close said flap. Opening a blocking flap 2 amounts to placing it (by rotation) so that it opposes the passage of the air flow F as little as possible while orienting it appropriately. Closing a blocking flap 2 amounts to placing it so that it opposes the flow of the air flow F to the maximum, in cooperation with the other blocking flaps 2. Said rotation axes 16 of the blocking flaps 2 are parallel to one another. Thus, the rotations applied to all the blocking flaps 2 are all rotations on one and the same axis, apart from a translation.

The blocking flap 2 according to the present invention comprises a panel 4 with a leading edge 6 and a trailing edge 10 relative to the flow or the air with the trailing edge 10 comprising at least one obstacle 18 configured to generate disturbances of the flow of the air flow F. The obstacle 18 according to the embodiment illustrated in FIG. 1 corresponds to a plurality of blocks 20 protruding from the plane of the trailing edge 10. The plurality of blocks 20 extend at least over more than half of the width, that is to say the transverse dimension Y, of the blocking flap 2. Since the inclined sections 12, 14 do not form part of the leading 6 and trailing 10 edges, there are no obstacles on the inclined sections 12,14, in other words the outer surface of the inclined sections 12,14 is smooth, and these inclined sections have no notch.

The blocks 20 can, for example, be in the form of a cylinder, namely blocks 20 which are delimited by a cylindrical surface and by two strictly parallel planes, as illustrated in FIG. 1, and have an elliptical cross section parallel to the plane of the trailing edge 10. Obviously, the blocks 20 can comprise other forms of cross section such as a circular, oval, semi-elliptical, rectangular, square, diamond-shaped section, to give a few nonlimiting examples.

The blocks 20 can also have other forms, such as, for example, dome, pyramid, bubble, cone, pin, and other such forms. The blocks 20 can also have different forms from one block 20 to another.

In a nonlimiting example, the blocks 20 can be aligned in a uniform arrangement on the trailing edge 10, for example in a row with a predetermined distance from one block 20 to the other. It also possible to have a plurality of rows of blocks 20 disposed staggered or in alignment. In another nonlimiting example, the plurality of blocks 20 is disposed randomly on the trailing edge 10.

The blocking flap 2 according to the invention can also comprise an obstacle 18 on the leading edge 6. The obstacle 18 according to the embodiment illustrated in FIG. 1 corresponds to a plurality of blocks 20 protruding from the plane of the leading edge 6.

Figure 2:
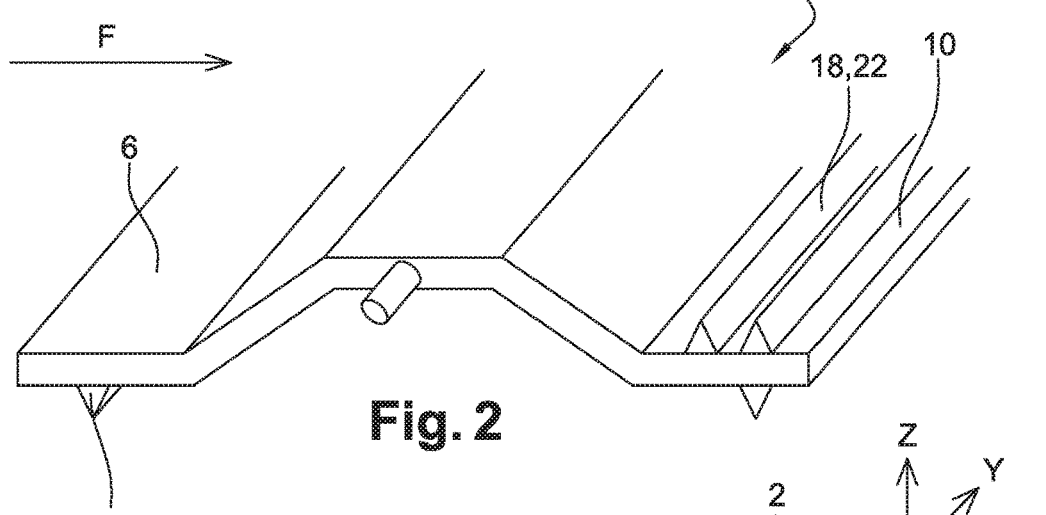
FIG. 2 illustrates a part of the blocking flap according to a second embodiment from a perspective view.

FIG. 2 schematically illustrates a blocking flap 2 according to another embodiment of the invention from a perspective view. Here, the obstacle 18 corresponds to a rib 22, or an elongate strip, protruding from the plane of the trailing edge 10. The obstacle 18 can also correspond to a furrow or a spline described in the plane of the trailing edge 10.

According to the embodiment illustrated in FIG. 2, the trailing edge 10 comprises two ribs 22 spaced apart and arranged to define a groove between the two. The ribs 22 extend at least over more than half of the width, that is to say the transverse dimension Y, of the blocking flap 2. The ribs 22 here have a triangular profile section, obviously, this profile section can be rectangular, square, semi-elliptical, or any other polygonal form (rhomboid, pentagonal, hexagonal, etc.).

Figure 3:
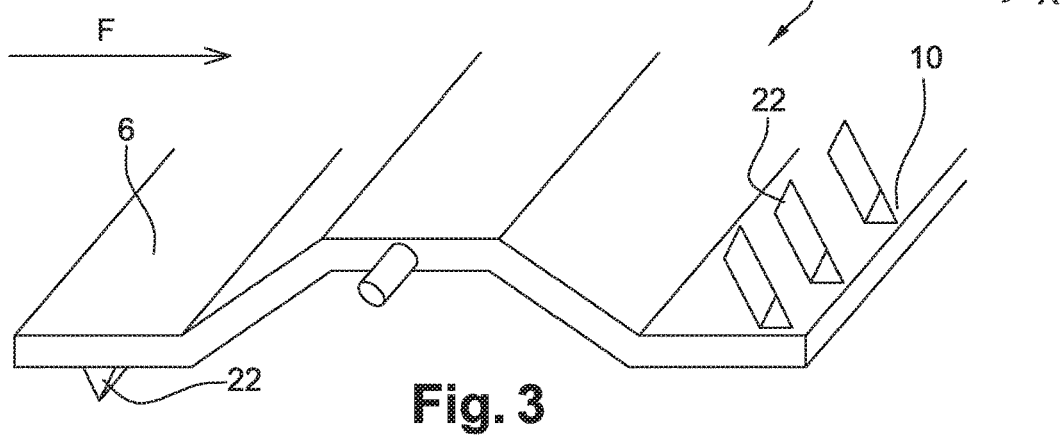
FIG. 3 illustrates a part of the blocking flap according to a third embodiment from a perspective view.

According to the embodiment illustrated in FIG. 3, the trailing edge 10 comprises a plurality of small ribs 22 spaced apart and arranged uniformly. The set of the small ribs 22 extends at least over more than hair of the width, that is to say the transverse dimension Y, of the blocking flap 2. The ribs 22 here have a triangular profile section, obviously, this profile section can be rectangular, square, semi-elliptical, or any other polygonal form (rhomboid, pentagonal, hexagonal, etc.).

The blocking flap 2 according to the invention according to all the envisageable embodiments can also comprise an obstacle 18 on the leading edge 6. Here, the obstacle 18 corresponds to a rib 22, or an elongate strip, protruding from the plane of the leading edge 6. The obstacle 18 can also correspond to a furrow or a spline.

The blocking flap 2 can also comprise, on at least one of its edges, a seal produced in an elastic material according to all the envisageable embodiments.

Figure 4:
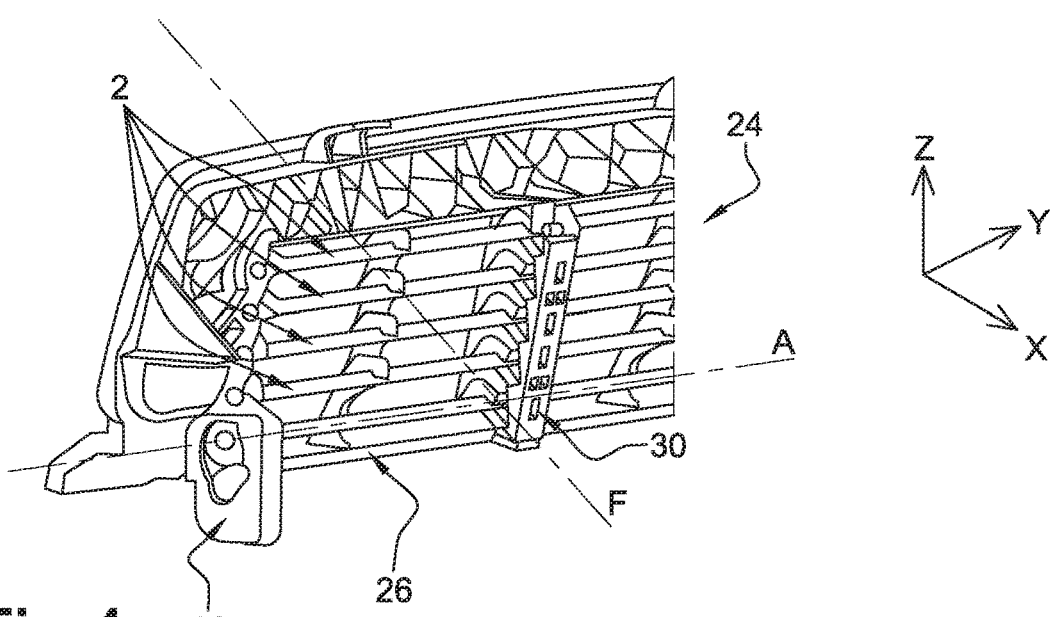
FIG. 4 illustrates a part of the air flow regulation device according to the invention from a perspective view.

The invention relates also to an air flow F regulation device 24 for a motor vehicle front end. FIG. 4 partly illustrates such an air flow F regulation device 24 which comprises a support frame 26 for the blocking flaps 2 and with an actuator 28 which drives the blocking flaps 2 between an open extreme position and a closed extreme position by a same rotary movement defined about a rotation axis represented by the axis A, the blocking flaps 2 being linked together by a connecting rod 30.

The support frame 26 corresponds to a frame with two longitudinal sides and two lateral sides for a given thickness. The support frame 26 has a rectangular form so that the longitudinal sides are greater than the lateral sides. The regulation device 24 is arranged so that the set of the blocking flaps 2 covers all of the internal surface of the support frame 26.

When the blocking flaps 2 are in open position as represented in FIG. 4, namely they extend in a longitudinal (X) and transverse (Y) direction, the air inlet is clear and the outside air flow can pass through the passage of the support frame 26 according to the arrow F. When the blocking flaps 2 are in closed position, that is to say that they extend in a transverse (Y} and vertical (Z) direction, for example relative to the axes of the vehicle, the air inlet is blocked and the air cannot cross the support frame 26, indeed, in this position, the blocking flaps 2 thus constitute an obstacle which opposes, by its frontal surface, the circulation of the air flow F.

In other words, the regulation device 24 is configured to switch from a closed configuration in which the blocking flaps 2 completely block the passage of the air flow F to an open configuration in which the blocking flaps 2 are positioned so as to allow the air flow F to pass with a maximum flow rate. The invention is not limited in the number of flaps present in the device. Indeed, it is possible to envisage having a system with a single flap covering all of the air inlet surface. The device comprises a set of identical flaps. This simplifies its construction.

Figure 5:
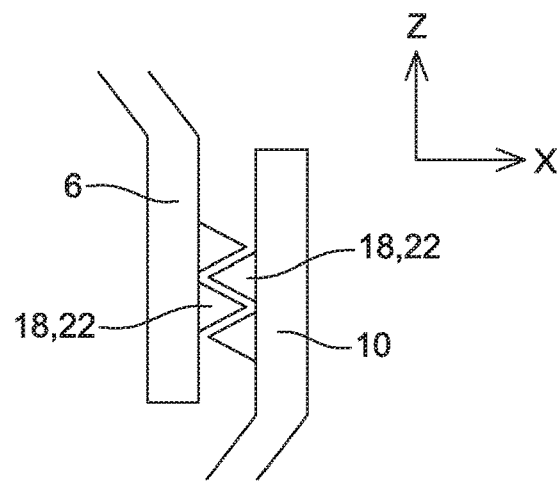
FIG. 5 illustrates a part of two blocking flaps according to the second embodiment from a profile view.

FIG. 5 illustrates an embodiment in which the blocking flaps 2 are in a closed configuration. The leading edge 10 of each blocking flap 2 is arranged to come to bear, or into abutment, against the leading edge 6 of another blocking flap 2 or against the support frame 26. In other words, the trailing edge 10 and the leading edge 6 come to face one another when the air flow regulation device adopts the closed configuration. The obstacles 18 arranged on the leading edges 6 are of a form complementing the obstacles 18 arranged on the trailing edges 10 so as to completely block the air inlet, thus guaranteeing a better seal. In other words, the trailing edge 10 here presents an obstacle 18 with a male part and the leading edge 6 presents an obstacle 18 with a female part, or vice versa. As illustrated in FIG. 5, if the ribs 22 present on the trailing edge 10 are arranged so as to define a groove, the rib 22 present on the leading edge 6 is configured so as to come to be introduced into the groove defined by the two ribs 22 present on the trailing edge 10. Obviously, the invention is not limited in the number of ribs and grooves present on each blocking flap 2.

According to an embodiment that is not illustrated, when the obstacle 18 arranged on the trailing edge 10 corresponds to a plurality of pins, in other words small pointed protuberances 20, the latter are intended to be engaged in corresponding orifices provided for that purpose in the obstacle 18, which can correspond to a perforated film or tape, arranged on the leading edge 6.

As illustrated in FIGS. 1, 2 and 3, the trailing edge 10 comprises obstacles 18 arranged on a face of the blocking flap 2. Similarly, the leading edge 6 comprises obstacles 18 which are arranged on the face of the blocking flap 2 which is opposite the face where the obstacles 18 of the trailing edge 10 are positioned. In other words, the trailing edge 10 and the leading edge 6 each comprise obstacles 18 which are arranged on opposing faces of the blocking flap 2. In other words, the obstacles 18 arranged on the leading edge 6 are positioned on a face of the blocking flap 2 opposite the face where the obstacles 18 arranged on the trailing edge 10 are positioned.

Figure 6A:
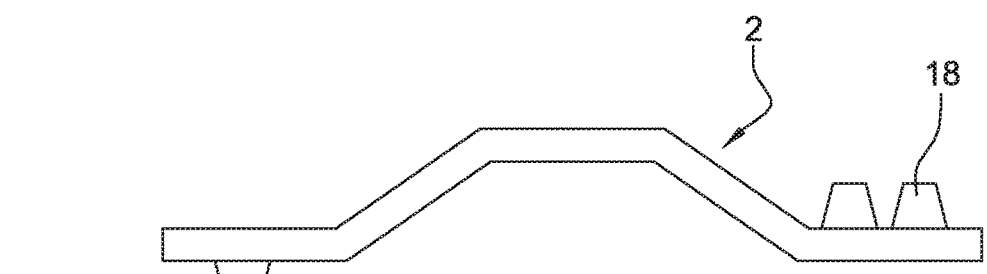
Figure 6B:
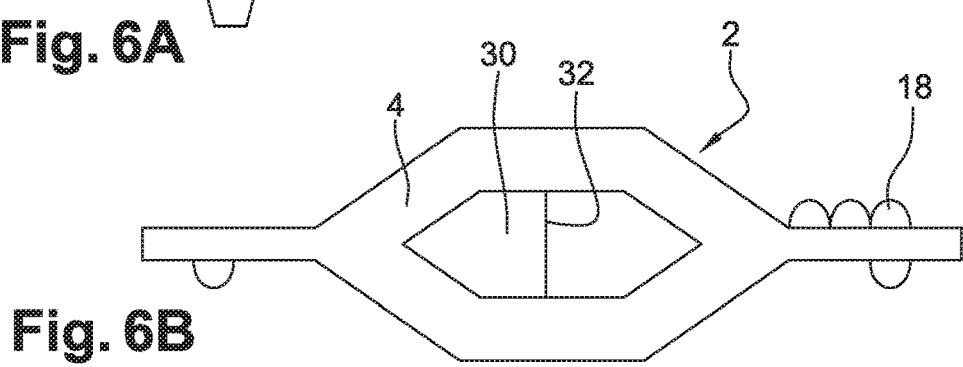

Each blocking flap 2 is for example obtained by an injection method, in other words it is molded in a single plastic piece as illustrated in FIG. 6A, the obstacles 18 being able to be overmolded subsequently. Each blocking flap 2 can also be obtained from an extrusion method, namely it comprises an internal cavity 30 within the panel 4, or, in other words, the body of the blocking flap 2, in particular the panel 4, comprises an outer skin which delimits a hollow as illustrated in FIG. 6B, the obstacles 18 being able to be overmolded subsequently. The body of the blocking flap 2 can, possibly, within its internal cavity 30, also comprise at !east one spacer 32 linking two opposing portions of the outer skin in order to stiffen the structure of the blocking flap 2. The internal cavities 30 are closed on either side by end-fittings, not illustrated, at each lateral end of the blocking flap 2.

According to an embodiment illustrated in FIG. 6B, the trailing edge 10 can comprise obstacles 18 arranged on the two opposing faces of the blocking flap 2. Similarly, the leading edge 6 can also comprise obstacles 18 arranged on the two opposing faces of the blocking flap 2.

In the embodiments described above, the obstacles for creating the disturbances are formed on the flaps.

Figure 7:
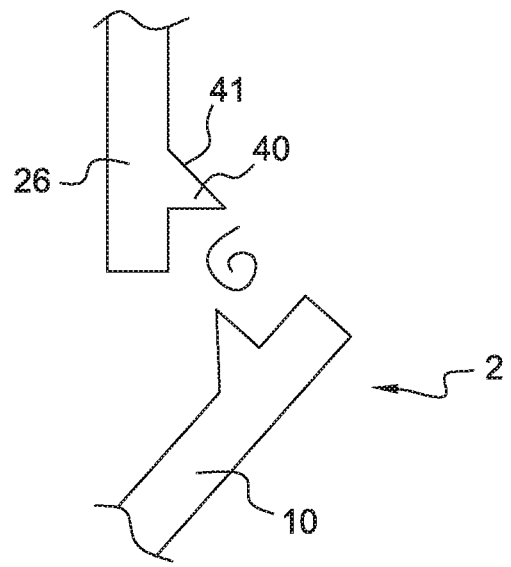
FIGS. 7 and 8 illustrate an embodiment of the invention.
Figure 8:
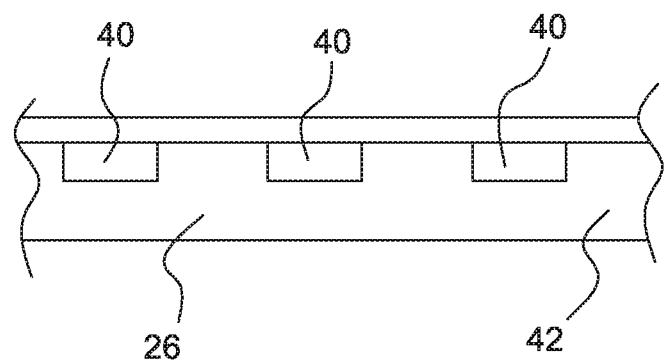

As illustrated in FIGS. 7 and 8, it is possible to provide obstacles 40 on the support frame 26, obstacles which are configured to generate disturbances in the flow of the air between this support frame and the flap 2 which is intended to come into abutment against the frame 26. The obstacles 40 can correspond to obstacles as defined previously, namely blocks, ribs, chicanes, etc.

The obstacles 40 on the frame 26 each comprise a protuberance 41 protruding substantially at right angles to the plane of the frame 26.

The obstacles 40 extend on a crossmember 42 of the frame 26, notably the top crossmember.

The obstacles 40 are distributed at regular intervals on the crossmember 42 of the support frame 26.

Each obstacle 40 has the form of a notch with a substantially rectangular perimeter when it is observed from a direction at right angles to a crossmember of the support frame 26, as can be seen in FIG. 8. In other words, the obstacle 40, and notably the protuberance 41, corresponds to a tread or a tooth protruding from the plane substantially at right angles to the plane of the frame 26. These notches or treads can be arranged all along the crossmember 42 of the frame 26, or these notches or treads can be arranged in spot fashion along the crossmember 42 of the frame 26. In other words, the frame 26, and notably the crossmember 42 of the frame 26, can correspond to a succession of notches, or treads, and of voids. The notches can be distributed regularly or irregularly on the crossmember 42 of the frame 26.

The obstacles 18, 22 of the flaps are arranged to come into contact with the obstacles 40 on the frame 26 when the flap is in abutment against the support frame, in other words, the obstacles 18,22 of the flaps are of a form complementing the obstacles 40 on the frame 26 so that they can be nested in one another.

The invention claimed is:

1. An air flow regulation device for an air inlet for a front-end module for a motor vehicle, comprising:
a support frame;
a plurality of blocking flaps mounted mobile on the support frame, at least one of the flaps comprising a leading edge and a trailing edge, one of the leading and trailing edges being arranged to come into abutment against the support frame,
the support frame comprising an obstacle configured to generate disturbances in the flow of the air between the support frame and the flap which is intended to come into abutment against the frame,
wherein the obstacle of the support frame is disposed upstream, relative to flow of the air, to the abutment between the support frame and the flap.

2. The device as claimed in claim 1, the obstacle being arranged to be in contact with the flap when the latter is in abutment on the frame.

3. The device as claimed in claim 1, the obstacle comprising a protuberance protruding substantially at right angles to the plane of the frame.

4. The device as claimed claim 1, the obstacle extending on a crossmember of the frame.

5. The device according to claim 1, the obstacle extending only a portion of the length of the crossmember.

6. The device as claimed in claim 1, the support frame comprising a plurality of obstacles configured to generate disturbances in the flow of the air between this support frame and the flap which is intended to come into abutment against the frame.

7. The device as claimed in claim 6, the obstacles being distributed, at regular intervals, over a crossmember of the support frame.

8. The device as claimed in claim 1, each flap comprising a panel with the leading edge and the trailing edge relative to the flow of the air, and the trailing edge comprises at least one obstacle configured to generate disturbances of the flow of the air.

9. The device as claimed in claim 8, wherein the obstacle of the flap comprises at least one protuberance protruding from the plane of the trailing edge.

10. The device as claimed in claim 9, wherein the obstacle of the flap is arranged to come into contact with the obstacle on the frame when the flap is in abutment against the support frame.

11. A blocking flap for an air flow regulation device for a front-end module for a motor vehicle, comprising:
a panel with a leading edge and a trailing edge relative to a flow of air, wherein the trailing edge comprises at least one first obstacle configured to generate disturbances of the flow of air,
the at least one obstacle of the flap comprising at least one protuberance protruding from the plane of the trailing edge,
wherein the at least one obstacle is mounted mobile on a support frame of the air flow regulation device, the support frame comprising a second obstacle configured to generate disturbances in the flow of the air between the support frame and the flap which comes into abutment against the frame,
wherein the at least one obstacle of the blocking flap is arranged to come into contact with the second obstacle on the support frame when the blocking flap is in abutment against the support frame, and
wherein the second obstacle of the support frame is disposed upstream, relative to flow of the air, to the abutment between the support frame and the flap.

* * * * *